Oct. 13, 1942.   A. SISCO   2,298,811
FISH LURE
Filed May 13, 1941
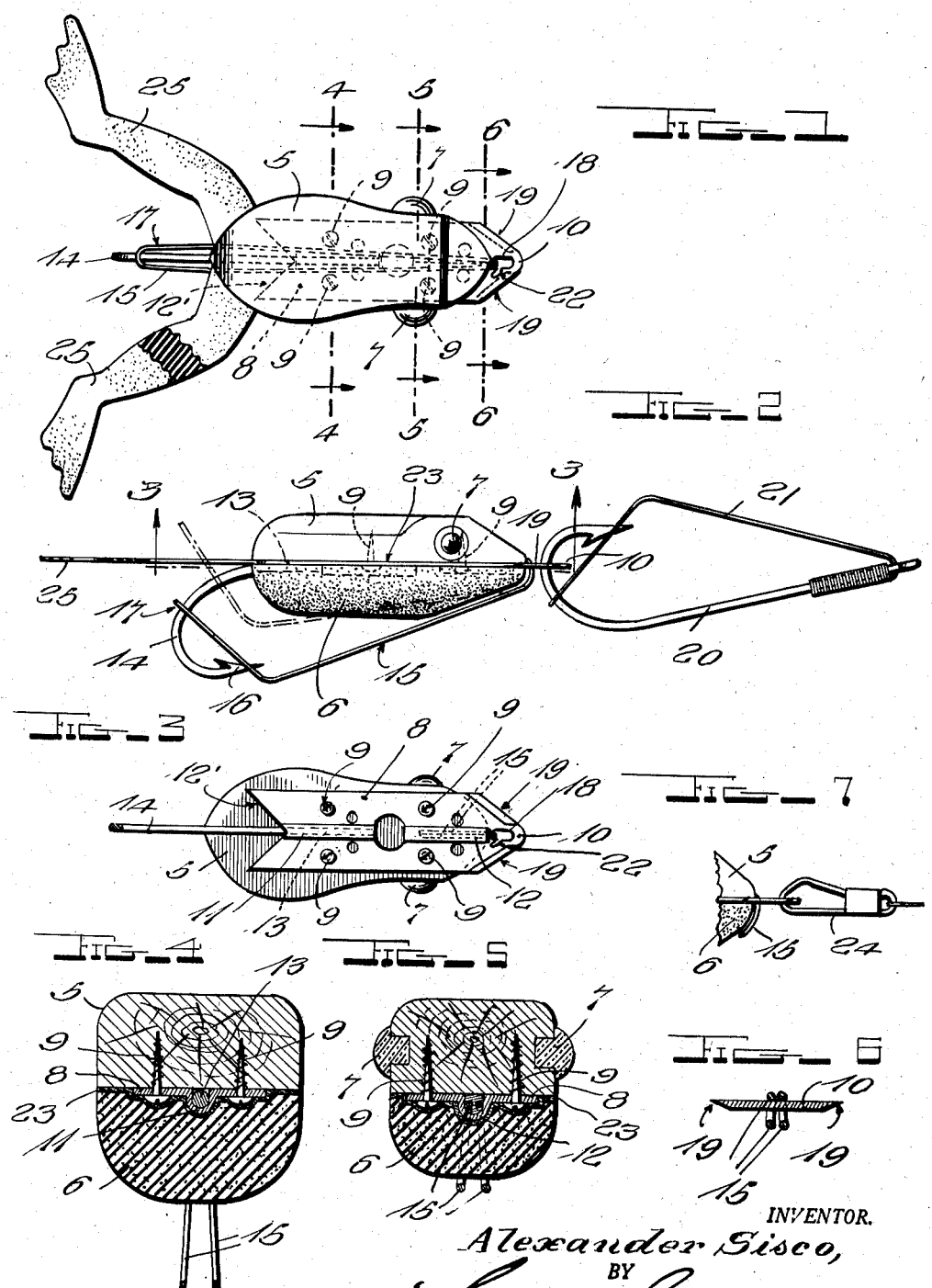
INVENTOR.
Alexander Sisco,
BY
Lacey & Lacey,
Attorneys Patented Oct. 13, 1942

2,298,811

UNITED STATES PATENT OFFICE 2,298,811

FISH LURE

Alexander Sisco, Kokomo, Ind.

Application May 13, 1941, Serial No. 393,259

8 Claims. (Cl. 43—42)

This invention relates to fish lures and more particularly to an artificial frog lure of the type shown and described in my copending application filed in the United States Patent Office on the 28th day of September, 1940, under Serial No. 358,919, the present invention being an improvement thereon.

The object of the invention is generally to improve and increase the efficiency of the lure by making the hook supporting tongue of rigid material and providing the free end of said tongue with a V-shaped knife edge so that the lure will cut through water vegetation when drawn through the water or when making a casting.

A further object of the invention is to provide a fish lure having a hook at both the front and rear end thereof, each hook having a flexible weed guard associated therewith.

A further object is to reinforce and strengthen the body of the lure by the provision of a metal plate interposed between the upper and lower sections of the lure and to which the front and rear hooks are anchored.

A further object is to provide a fish lure constructed in simulation of a live frog and comprising upper and lower sections, one of which is constructed of wood and the other of sponge rubber so as to cause the lure to float on the surface of the water and thus attract the attention of the fish.

A further object is to provide the rear hook with a flexible weed guard, one end of which is anchored to the tongue of the reinforcing plate while the other end thereof extends beneath the sponge rubber stomach of the frog for coaction with the bill of the rear hook.

In the accompanying drawing forming a part of this specification and in which similar numerals of reference indicate corresponding parts in all the figures of the drawing:

Figure 1 is a top plan view of a fish lure embodying the present invention.

Figure 2 is a side elevation,

Figure 3 is a bottom plan view of the body of the lure with the sponge rubber section thereof detached and showing the construction of the reinforcing plate and cutting tongue, Figure 4 is a transverse sectional view taken on the line 4—4 of Figure 1, Figure 5 is a similar view taken on the line 5—5 of Figure 1, Figure 6 is a transverse sectional view taken on the line 6—6 of Figure 1, and Figure 7 is a detail side elevation illustrating a modified form of the invention.

The improved casting lure forming the subject-matter of the present invention comprises a body portion preferably formed of upper and lower sections 5 and 6, the upper section being preferably constructed of wood or other light material to cause the lure to float on the surface of the water and constitute the back of a frog and the lower section 6 being formed of sponge rubber and forming the stomach of the frog. The upper wood section is provided with oppositely disposed glass eyes 7 and the exterior surface of the upper section may be painted or otherwise embellished in imitation of the skin of a frog.

Interposed between the upper and lower sections 5 and 6 of the lure is a metallic reinforcing plate 8 rigidly secured to the upper section 5 by screws or similar fastening devices 9 and having its forward portion projected beyond the front end of the lure to form a hook attaching tongue 10. The metal constituting the plate 8 is bent medially thereof to form front and rear tubular sockets 11 and 12, while the rear end of the plate 8 is preferably formed with a V-shaped notch 12', as best shown in Figure 3 of the drawing. Seated in the rear tubular socket 11 is the shank 13 of a rear hook 14 and this shank may be rigidly secured to the plate by solder or otherwise. Associated with the hook 14 is a weed guard 15 preferably formed of companion strands of flexible wire which span the barb 16 of the hook and have their connected ends 17 yieldably resting on the rear portion of the hook 14. The forward ends of the strands of wire constituting the weed guard 15 are extended upwardly through a slot 18 in the tongue 10 and are thence extended laterally and soldered or otherwise rigidly secured within the forward socket 12.

The tongue 10 is provided with converging cutting edges 19 which cut through water vegetation without interference when drawing the lure through the water or making a casting. Extending through the slot 18 is a forward hook 20 provided with a weed guard 21 similar in construction to the weed guard 15. One of the side walls of the slot 10 is cut away to form an auxiliary slot or opening 22 to accommodate the barb of the hook 20 when attaching said hook to or removing the hook from the supporting tongue.

Interposed between the upper and lower sections comprising the body of the lure is a strip of canvas, canton flannel or other suitable fabric, indicated at 23, said strip of fabric extending over the reinforcing plate 8 and being provided on its upper and lower faces with glue or other suitable adhesive material for the purpose of securing the sections of the lure securely in assembled position, as best shown in Figure 4 of the drawing.

If desired, the forward hook 20 may be dispensed with and a suitable snap 24 fitted within the opening 18 of the tongue and to which snap the fishing line may be secured in any suitable manner.

The fish lure is also provided with flexible members 25 simulating the hind legs of a frog and which members have their inner ends interposed between the sections of the lure and glued or otherwise fastened to the fabric strip 23.

As the lure is drawn through the water, the wood upper section thereof will cause the lure to float either on the surface or partly below the surface of the water so as to attract attention of the fish and should the lure, when used in this manner, be drawn through water vegetation, the converging edges of the knife 19 will cut through the water vegetation and thus not interfere with the passage of the lure. Should the line come in contact with the weed guard 15, said guard will direct the line downwardly over the barb 16 of the rear hook so as to prevent the line from becoming entangled therewith and conversely the weed guard 21 of the forward hook will prevent the barb of said hook from becoming entangled in growing water vegetation.

The sponge rubber constituting the lower section or stomach 6 of the lure will preferably be light in color so as to contrast with the green back of the frog and this light color of the stomach of the frog will tend to attract a fish and cause it to strike when fishing in either quiet or turbulent water.

The lures may be made in different sizes and shapes and constructed of any suitable material without departing from the spirit of the invention.

Having thus described the invention, what is claimed as new is:

1. A fish lure comprising a body portion including upper and lower sections, one of which is formed of fibrous material and the other of sponge rubber, a reinforcing plate interposed between the sections and having its forward end projected longitudinally beyond the sections to form a tongue, and a hook secured to said reinforcing plate and disposed at the rear of the lure.

2. A fish lure comprising upper and lower sections, a reinforcing plate interposed between the sections and having its forward end extended longitudinally beyond the sections to form a projecting tongue having converging side walls sharpened to form cutting edges, and a hook secured to said reinforcing plate and disposed at the rear of the lure.

3. A fish lure comprising upper and lower sections, a reinforcing plate interposed between said sections and provided with spaced tubular sockets, the forward end of the plate being extended longitudinally beyond the lure to form a tongue provided with a cutting edge, a fish hook disposed at the rear of the lure and provided with a shank fitting within one of said sockets, and a weed guard having one end thereof coacting with the barb of the hook and its other end fitted within the other socket.

4. A fish lure comprising upper and lower sections, a reinforcing plate interposed between said sections and having its forward portion extended longitudinally beyond the front of the lure to form a tongue having converging cutting edges and provided with a slot disposed between said edges, a rear hook secured to said plate, and a forward hook having its bill extended through the slot in the tongue.

5. A fish lure comprising a body portion formed of upper and lower sections, one of which is made of wood and the other of sponge rubber, a reinforcing plate interposed between said sections and provided with spaced medially disposed tubular sockets, the forward end of the plate being extended longitudinally beyond the body portion to form a slotted tongue having a cutting edge, a rear hook including a shank fitting within one of the tubular sockets, a weed guard having its forward portion fitted in the other socket and thence extended downwardly beneath the sponge rubber section for coaction with the bill of the rear hook, a forward hook extending through the slot in the tongue, and a weed guard associated with said forward hook.

6. A fish lure comprising a body portion formed of upper and lower sections, a reinforcing plate interposed between said sections, fastening devices extending through the reinforcing plate and into one section, a strip of fabric extending over the reinforcing plate and secured to both sections, said reinforcing plate being extended to form a tongue having a slot therein and provided with a cutting edge, a rear hook anchored to said reinforcing plate, and means extending through the slot for attachment to a fishing line.

7. A fish lure comprising an upper section formed of wood and constructed in simulation of the back of a live frog, a lower section constructed of sponge rubber and simulating the stomach of a frog, a reinforcing plate interposed between said sections and secured thereto, said plates having its forward end extended beyond the forward end of the lure to form a tongue having converging cutting edges and provided with a slot, a rear hook secured to said reinforcing plate and extending downwardly beneath the sponge rubber section, and a forward hook extending through the slot in the tongue.

8. A fish lure comprising upper and lower sections, a reinforcing plate interposed between said sections and having one end thereof projecting longitudinally thereof and forming a tongue having converging cutting edges and provided with a slot, one wall of which is cut away to form an opening communicating therewith to accommodate the bill of a hook, said reinforcing plate being formed with spaced longitudinally disposed sockets, a rear hook having a portion thereof anchored within one of the sockets and extended downwardly below the lower section of the lure, and a forward hook having its bill extended through said opening and slot in the tongue, and weed guards associated with said hooks, the weed guard of the rear hook having its end portion anchored within the other longitudinal socket.

ALEXANDER SISCO.